(12) United States Patent
Motoji et al.

(10) Patent No.: US 12,517,386 B2
(45) Date of Patent: *Jan. 6, 2026

(54) ISOLATOR

(71) Applicant: KYOCERA Corporation, Kyoto (JP)

(72) Inventors: Reona Motoji, Tokyo (JP); Tomoya Sugita, Tokyo (JP); Dan Maeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/842,762

(22) PCT Filed: Oct. 20, 2023

(86) PCT No.: PCT/JP2023/038093
§ 371 (c)(1),
(2) Date: Aug. 29, 2024

(87) PCT Pub. No.: WO2025/083911
PCT Pub. Date: Apr. 24, 2025

(65) Prior Publication Data
US 2025/0264747 A1   Aug. 21, 2025

(51) Int. Cl.
*G02F 1/095* (2006.01)

(52) U.S. Cl.
CPC .................... *G02F 1/0955* (2013.01)

(58) Field of Classification Search
CPC ....................................... G02F 1/0955
(Continued)

(56) References Cited

U.S. PATENT DOCUMENTS 7,664,346 B2   2/2010 Mizumoto et al.
7,826,690 B2 * 11/2010 Nakajima ............. G02F 1/0955
385/6

(Continued)

FOREIGN PATENT DOCUMENTS

CN        107870456 A    4/2018
EP        2 746 839 A1   6/2014
(Continued)

OTHER PUBLICATIONS

International Search Report issued in PCT/JP2023/038093; mailed on Nov. 28, 2023.
(Continued)

*Primary Examiner* — Robert Tavlykaev
(74) *Attorney, Agent, or Firm* — Studebaker Brackett PLLC (57) ABSTRACT

An isolator 10 includes a substrate 11, waveguide portions 12, an insulating layer 13, and a non-reciprocal member 14. The waveguide portions 12 extend along a main surface of the substrate 11, and are positioned side by side on the main surface. The insulating layer 13 covers at least part of outer edges of the waveguide portions 12, and includes a recess 18 overlapping with a first waveguide portion 16 when viewed in a normal direction of the main surface. The non-reciprocal member 14 overlaps with at least part of the first waveguide portion 16 inside the recess 18 when viewed in the normal direction. In a cross-section perpendicular to an extension direction of the first waveguide portion 16, expressions (1) and (2) are satisfied: $w1 \leq w3 \leq mfd1+mfd2-w2-2 \times x$ ... (1), $x \geq (mfd2-w2)/2$ ... (2).

9 Claims, 9 Drawing Sheets (58) Field of Classification Search
USPC .............................................. 385/6
See application file for complete search history.

(56) References Cited

U.S. PATENT DOCUMENTS

| | | | | |
|---|---|---|---|---|
| 8,335,407 | B2* | 12/2012 | Yokoi | G02F 1/0955 |
| | | | | 385/14 |
| 11,982,888 | B2 | 5/2024 | Motoji et al. | |
| 2007/0116399 | A1* | 5/2007 | Sato | G02F 1/095 |
| | | | | 385/132 |
| 2016/0341981 | A1* | 11/2016 | Carroll | G02B 6/2746 |
| 2017/0269395 | A1 | 9/2017 | Heck et al. | |
| 2021/0405294 | A1* | 12/2021 | Sodagar | G02B 6/1228 |
| 2022/0206325 | A1* | 6/2022 | Yoshikawa | G02B 6/2746 |
| 2022/0260867 | A1* | 8/2022 | Yoshikawa | G02B 6/42 |
| 2023/0288633 | A1 | 9/2023 | Sugita et al. | |
| 2025/0123504 | A1* | 4/2025 | Kim | G02F 1/0955 |
| 2025/0130450 | A1* | 4/2025 | Motoji | G02B 6/126 |

FOREIGN PATENT DOCUMENTS

| | | | |
|---|---|---|---|
| JP | 2022-182107 | A | 12/2022 |
| JP | 2023-131665 | A | 9/2023 |
| WO | 2007/083419 | A1 | 7/2007 |

OTHER PUBLICATIONS

Written Opinion of the International Searching Authority issued in PCT/JP2023/038093; mailed Nov. 28, 2023.

* cited by examiner

ISOLATOR

TECHNICAL FIELD

The present invention relates to an isolator.

BACKGROUND OF INVENTION

A proposed isolator utilizes a non-reciprocal phase effect (see Patent Literature 1). Consideration has been made to formation of the isolator on a semiconductor substrate. The semiconductor substrate also includes other stacked constituent elements, and an insulating film is thus formed to a relatively high position from the substrate. Forming an isolator on a semiconductor substrate needs disposing a magnetic member adjacent to a waveguide that is formed as a core on the substrate. Consideration has been made to forming a trench by etching to complete a semiconductor process, and embedding a magnetic material in the trench thus formed.

CITATION LIST

Patent Literature

Patent Literature 1: International Publication No. 2007/083419

SUMMARY

Problem to be Solved

An isolator is required to be reduced in size while exhibiting a non-reciprocal phase effect.

In view of the problems with the related art as described above, the present disclosure provides an isolator that can be reduced in size while exhibiting a non-reciprocal phase effect.

Solution to Problem

In order to solve the problems described above, according to a first aspect, an isolator includes a substrate, a plurality of waveguide portions, an insulating layer, and a non-reciprocal member. The plurality of waveguide portions extends along a main surface of the substrate and is positioned side by side on the main surface. The insulating layer covers at least part of outer edges of the plurality of waveguide portions in a cross-section perpendicular to an extension direction of the plurality of waveguide portions, and includes a recess in a surface on an opposite side from the substrate at a position overlapping with a first waveguide portion that is part of the plurality of waveguide portions when viewed in a normal direction of the main surface. The non-reciprocal member is positioned to overlap with at least part of the first waveguide portion inside the recess when viewed in the normal direction of the main surface. In a cross-section perpendicular to an extension direction of the first waveguide portion, when a length of the first waveguide portion in a width direction perpendicular to the normal direction is w1, an interval in the width direction between an end of the non-reciprocal member and the waveguide portion adjacent to the first waveguide portion is x, a mode field diameter of the first waveguide portion is mfd1, a mode field diameter of the waveguide portion is mfd2, a length in the width direction of the waveguide portion is w2, and a length in the width direction of the non-reciprocal member is w3, expressions (1) and (2) are satisfied:

$$w1 \le w3 \le mfd1 + mfd2 - w2 - 2 \times x \qquad (1)$$

$$x \ge (mfd2 - w2)/2. \qquad (2)$$

DESCRIPTION OF EMBODIMENTS

An isolator according to an embodiment of the present disclosure will be described hereinafter with reference to the drawings.

Figure 1:
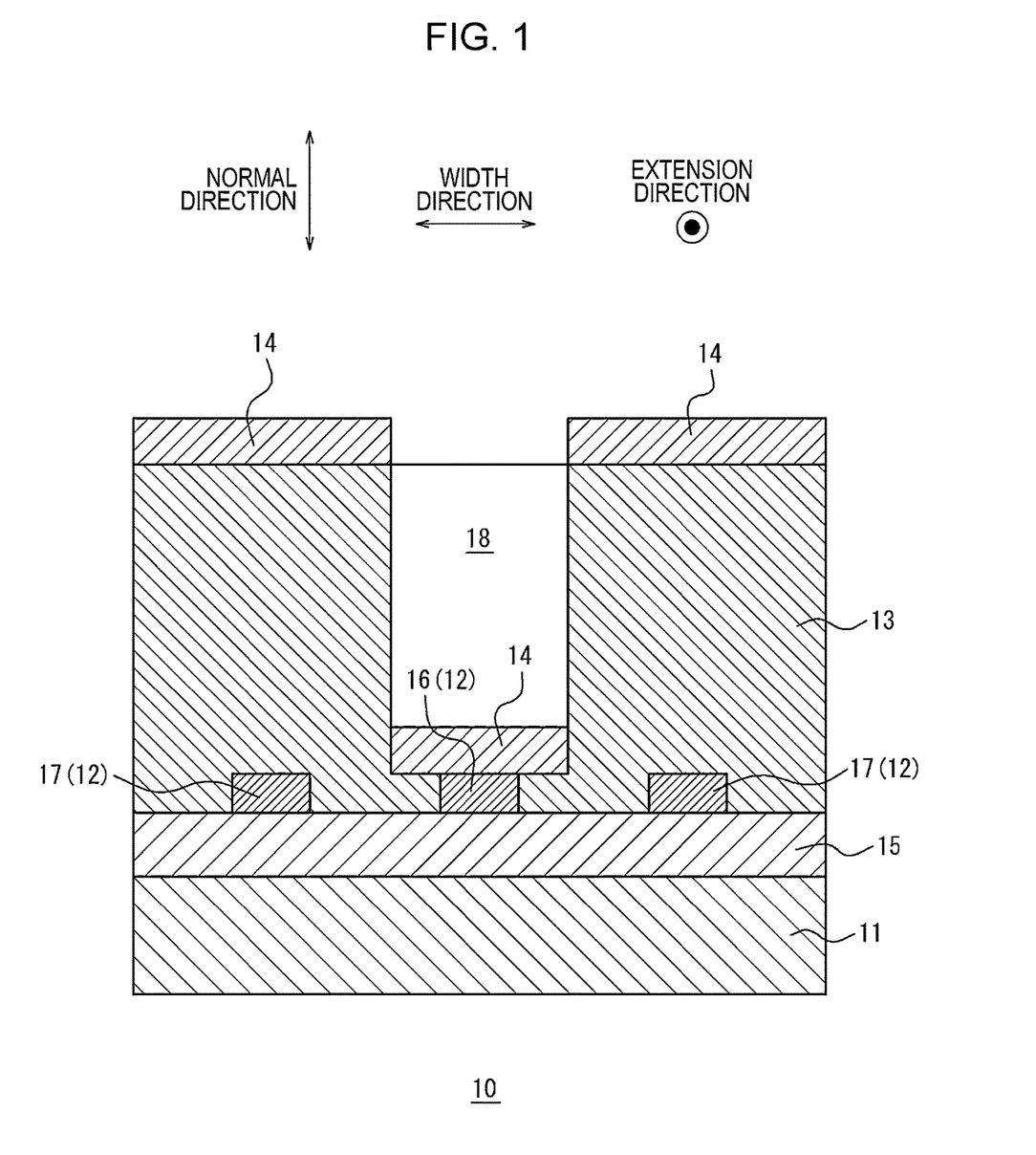
FIG. 1 is a sectional view taken along a cross-section perpendicular to an extension direction of a first waveguide portion of an isolator according to an embodiment.

As illustrated in FIG. 1, an isolator 10 includes a substrate 11, a plurality of waveguide portions 12, an insulating layer 13, and a non-reciprocal member 14. The isolator 10 may further include a box layer 15. The isolator 10 is assumed to be applied to an electromagnetic wave having a wavelength from 1200 nm to 1600 nm. The isolator 10 may be attached to an emitter. The emitter emits an electromagnetic wave having a wavelength selectable from 1200 nm to 1600 nm.

The substrate 11 has a flat plate shape. The substrate 11 may be made of a conductor such as a metal, a semiconductor such as silicon, glass, a resin, or the like. In the present embodiment, the substrate 11 is made of silicon (Si).

The box layer 15 may be stacked to cover a substrate surface of the substrate 11. The box layer 15 may be made of an insulator such as a silicon oxide film.

Figure 2:
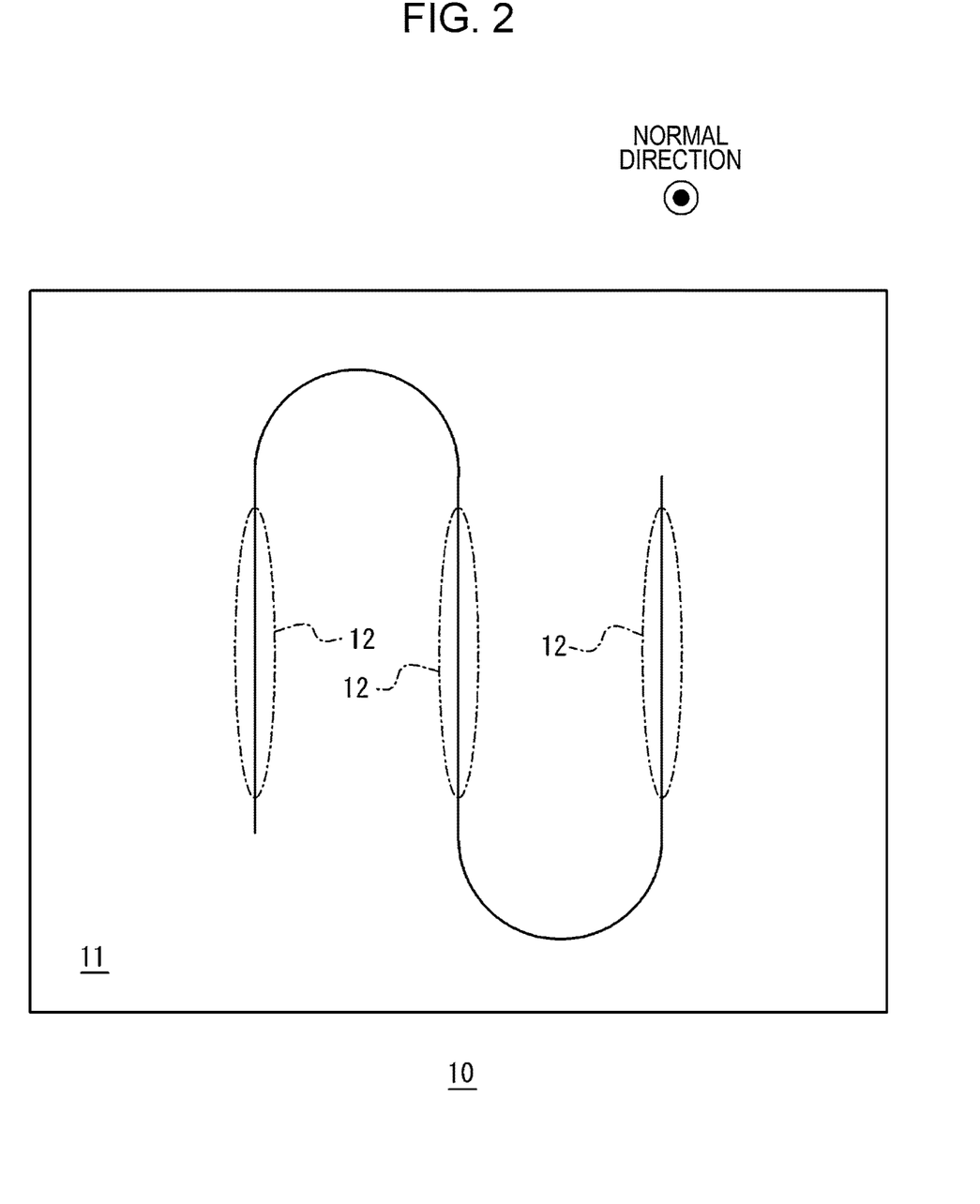
FIG. 2 is an explanatory view of a configuration of waveguide portions in the isolator illustrated in FIG. 1 when viewed in a normal direction.
Figure 3:
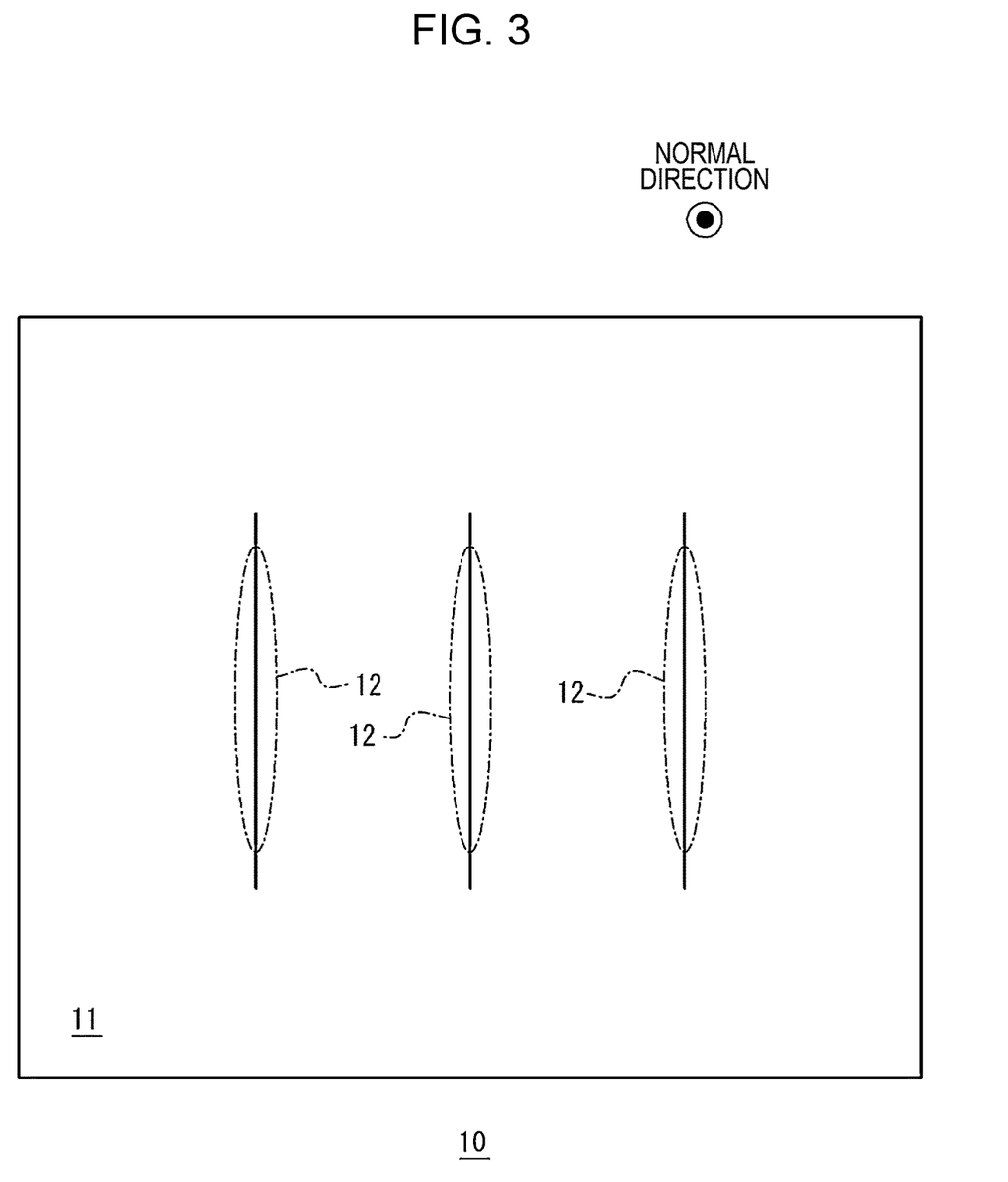
FIG. 3 is an explanatory view of a configuration of waveguide portions in a variation of FIG. 2 when viewed in the normal direction.

The plurality of waveguide portions 12 extends along a main surface of the substrate 11. The main surface may be the largest surface. The plurality of waveguide portions 12 is positioned side by side along the main surface. The plurality of waveguide portions 12 may be parallel to each other. The plurality of waveguide portions 12 may correspond to part of a single waveguide directly or indirectly continuous as illustrated in FIG. 2, or part of waveguides independent from one another, in other words, different from one another as illustrated in FIG. 3.

As illustrated in FIG. 1, the plurality of waveguide portions 12 includes a first waveguide portion 16 and a second waveguide portion 17. The first waveguide portion 16 is positioned to overlap with a recess 18 of the insulating layer 13 to be described later when viewed in a normal direction of the main surface of the substrate 11. In the present application, a normal direction means the normal direction of the main surface of the substrate 11. At least part or the entirety in a width direction of the first waveguide portion 16 may overlap with the recess 18. A width direction corresponds to a direction perpendicular to both an extension direction and the normal direction of the waveguide portion 12. In the present application, the width direction and the extension direction mean the width direction and the extension direction of the waveguide portion 12, respectively, unless particularly limited. The second waveguide portion 17 may be positioned away from the recess 18 when viewed in the normal direction. The first waveguide portion 16 and the second waveguide portion 17 will each be called the waveguide portion 12 unless otherwise distinguished from each other in the following description.

The waveguide portion 12 is covered at least with the insulating layer 13 and the box layer 15. The waveguide portion 12 may further be covered with the non-reciprocal member 14. The waveguide portion 12 will also be referred to as a core. The insulating layer 13 and the box layer 15 will also be referred to as cladding. The core and the cladding may each contain a dielectric. The waveguide portion 12 will also be referred to as a dielectric line. Materials for the core and the cladding are determined such that the core is larger in relative dielectric constant than the cladding. In other words, the materials for the core and the cladding are determined such that the cladding is larger in refractive index than the core. In such a configuration, an electromagnetic wave propagating in the core can be entirely reflected at a boundary with the cladding. This can reduce a loss of the electromagnetic wave propagating in the core.

The core and the cladding may be larger in relative dielectric constant than air. The core and the cladding being larger in relative dielectric constant than air can suppress leakage of the electromagnetic wave from the isolator 10. This can reduce a loss caused by radiation of the electromagnetic wave outward from the isolator 10. The waveguide portion 12 may be made of silicon or the like.

The insulating layer 13 covers at least part of outer edges of the plurality of waveguide portions 12 in a cross-section perpendicular to the extension direction. The insulating layer 13 may be positioned on a side of the substrate 11 where the waveguide portions 12 are positioned. The insulating layer 13 may be stacked on an opposite side of the box layer 15 from the substrate 11.

Figure 4:
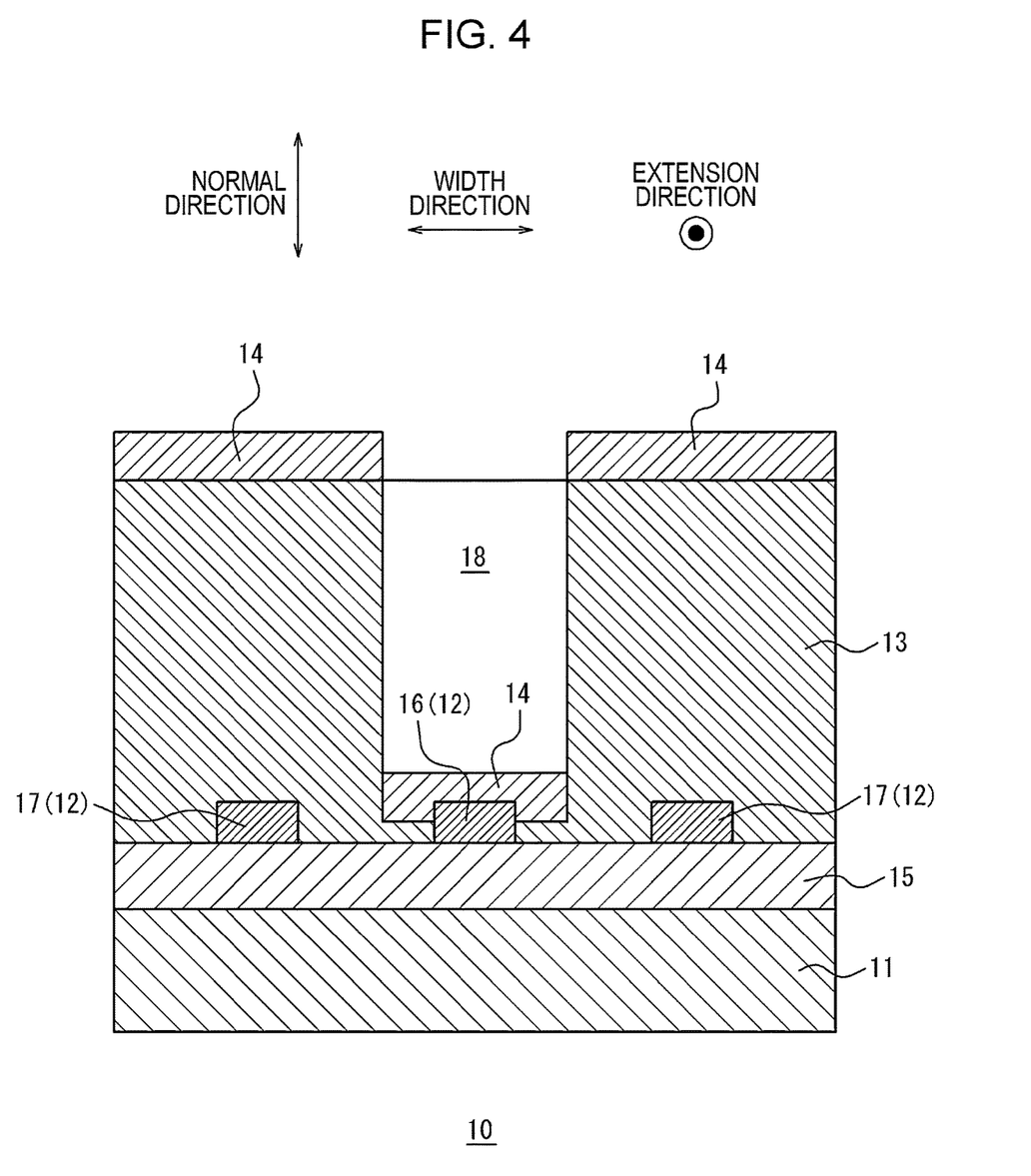
FIG. 4 is a sectional view of a variation of the isolator illustrated in FIG. 1.

The insulating layer 13 may cover at least part of at least a side surface of the first waveguide portion 16. A side surface is parallel to both the extension direction and the normal direction. As illustrated in FIG. 4, the insulating layer 13 may alternatively cover part of the side surface of the waveguide portion 12. The insulating layer 13 may further entirely cover a side surface of the second waveguide portion 17.

Figure 5:
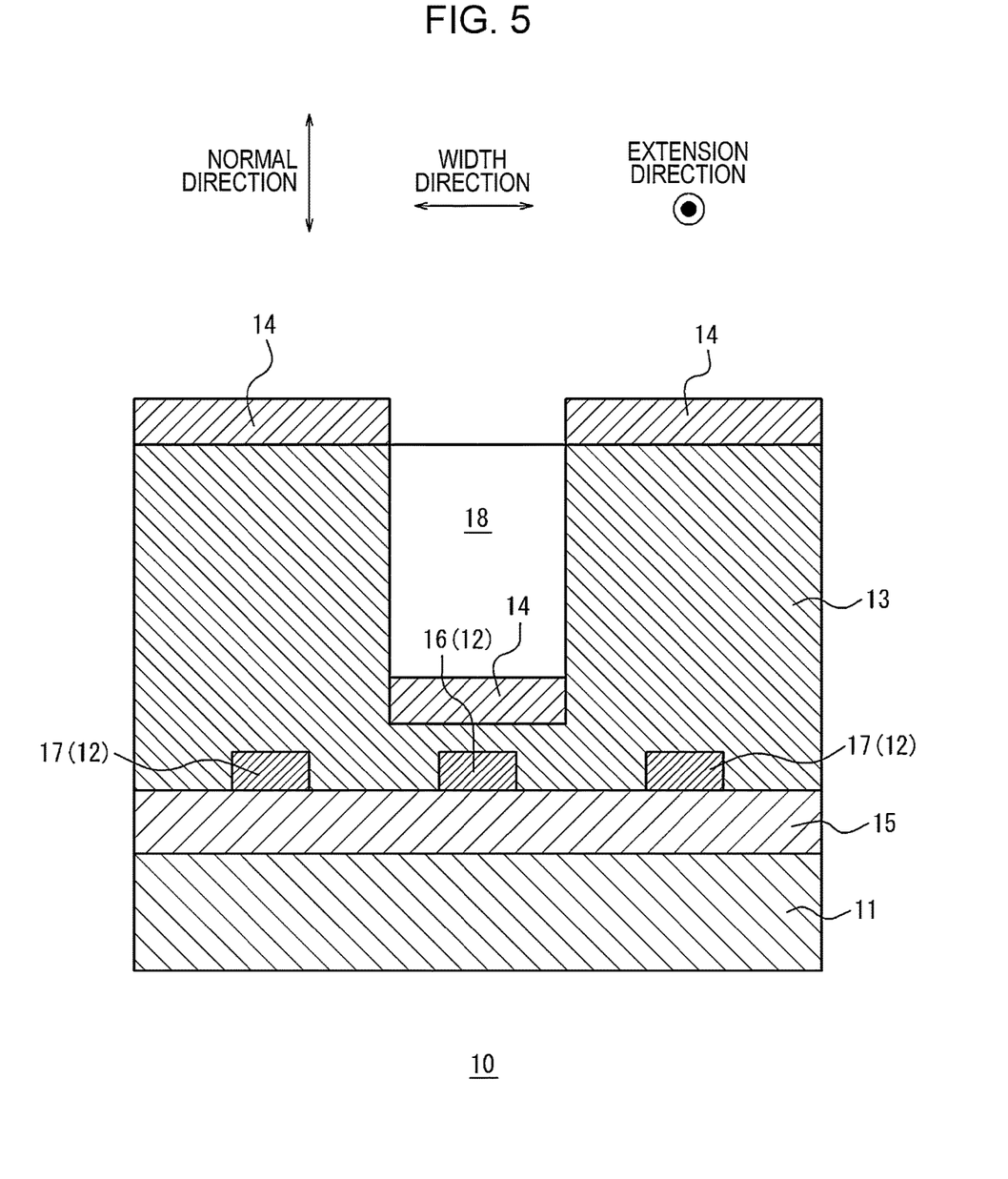
FIG. 5 is a sectional view of another variation of the isolator illustrated in FIG. 1.

As illustrated in FIG. 5, the insulating layer 13 may cover a surface of the first waveguide portion 16 on an opposite side from the substrate 11. Furthermore, as illustrated in FIGS. 1 and 4, the insulating layer 13 may cover a surface of the second waveguide portion 17 on an opposite side from the substrate 11.

As illustrated in FIGS. 1, 4, and 5, the insulating layer 13 may include the recess 18 positioned to overlap with the first waveguide portion 16, which is part of the plurality of waveguide portions 12, when viewed in the normal direction. The recess 18 is recessed in a surface of the insulating layer 13 on an opposite side from the substrate 11.

As illustrated in FIG. 1, the recess 18 may include a bottom surface positioned at the same level in the normal direction as the surface (hereinafter, also called "upper surface") of the first waveguide portion 16 on the opposite side from the substrate 11. In other words, the bottom surface of the recess 18 is flush with the upper surface of the first waveguide portion 16. As illustrated in FIG. 4, the bottom surface of the recess 18 may alternatively be positioned closer in the normal direction to the substrate 11 than is the upper surface of the first waveguide portion. As illustrated in FIG. 5, the bottom surface of the recess 18 may still alternatively be farther in the normal direction from the substrate 11 than is the upper surface of the first waveguide portion 16.

As illustrated in FIG. 4, when the bottom surface of the recess 18 is positioned closer in the normal direction to the substrate 11 than is the upper surface of the first waveguide portion 16, the bottom surface of the recess 18 and the upper surface of the first waveguide portion 16 may have a level difference equal to or less than 100 nm. This is because the level difference may influence crystallization of the non-reciprocal member 14. When Ce:YIG (cerium-substituted yttrium iron garnet) is used as the non-reciprocal member 14, a discontinuity in the Ce:YIG film due to the level difference may inhibit crystallization of Ce:YIG during annealing for crystallization. The level difference is thus preferably equal to or less than 100 nm in order to suppress inhibition of crystallization.

Figure 6:
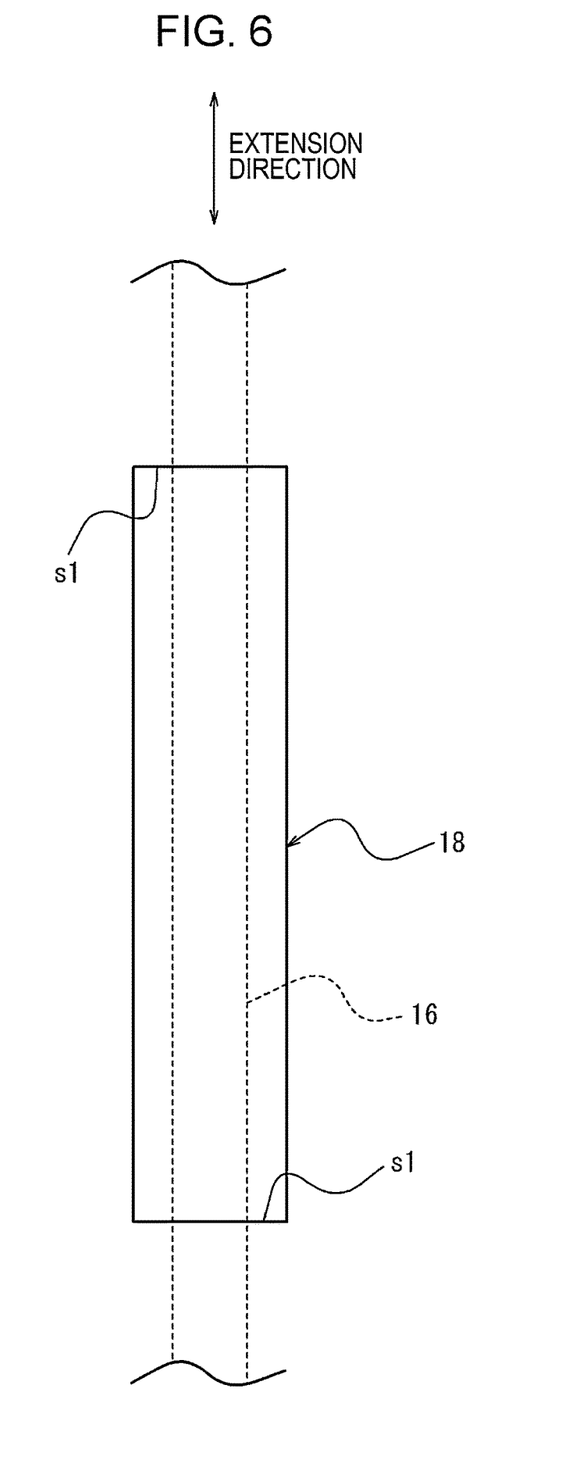
FIG. 6 is an explanatory view of a shape of a recess illustrated in FIG. 1 when viewed in the normal direction.
Figure 7:
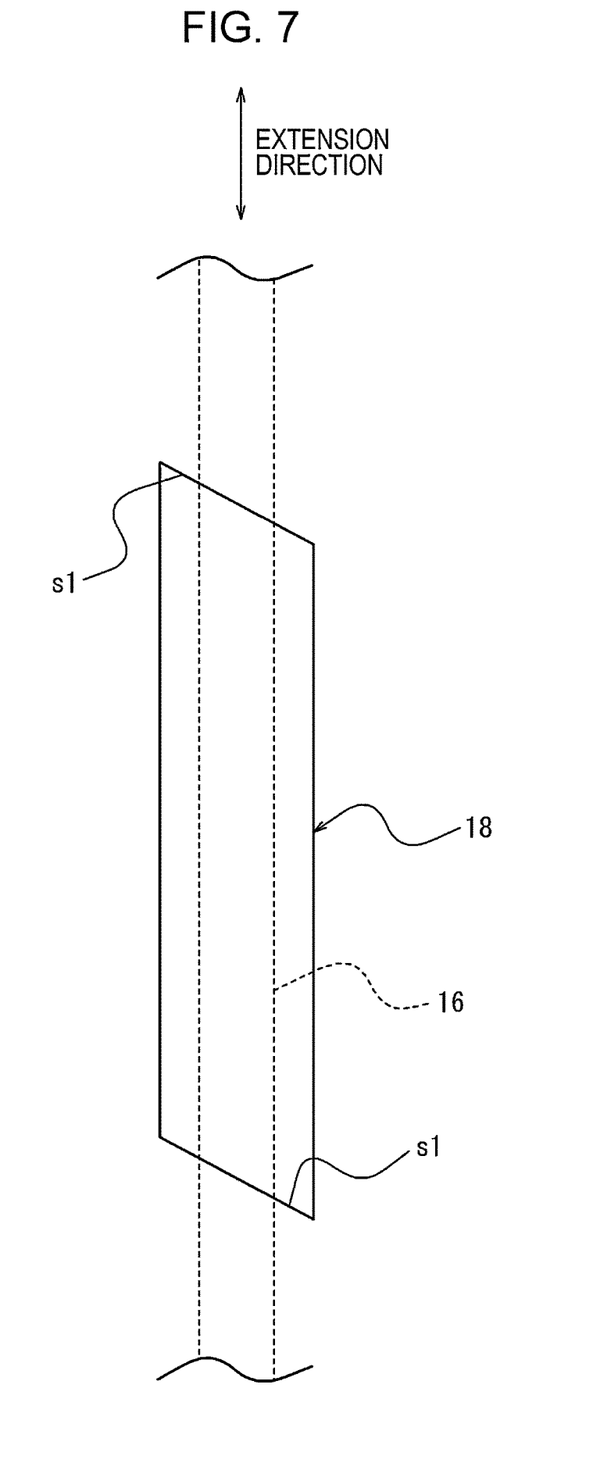
FIG. 7 is an explanatory view of a shape of a recess in a variation of FIG. 6 when viewed in the normal direction.
Figure 8:
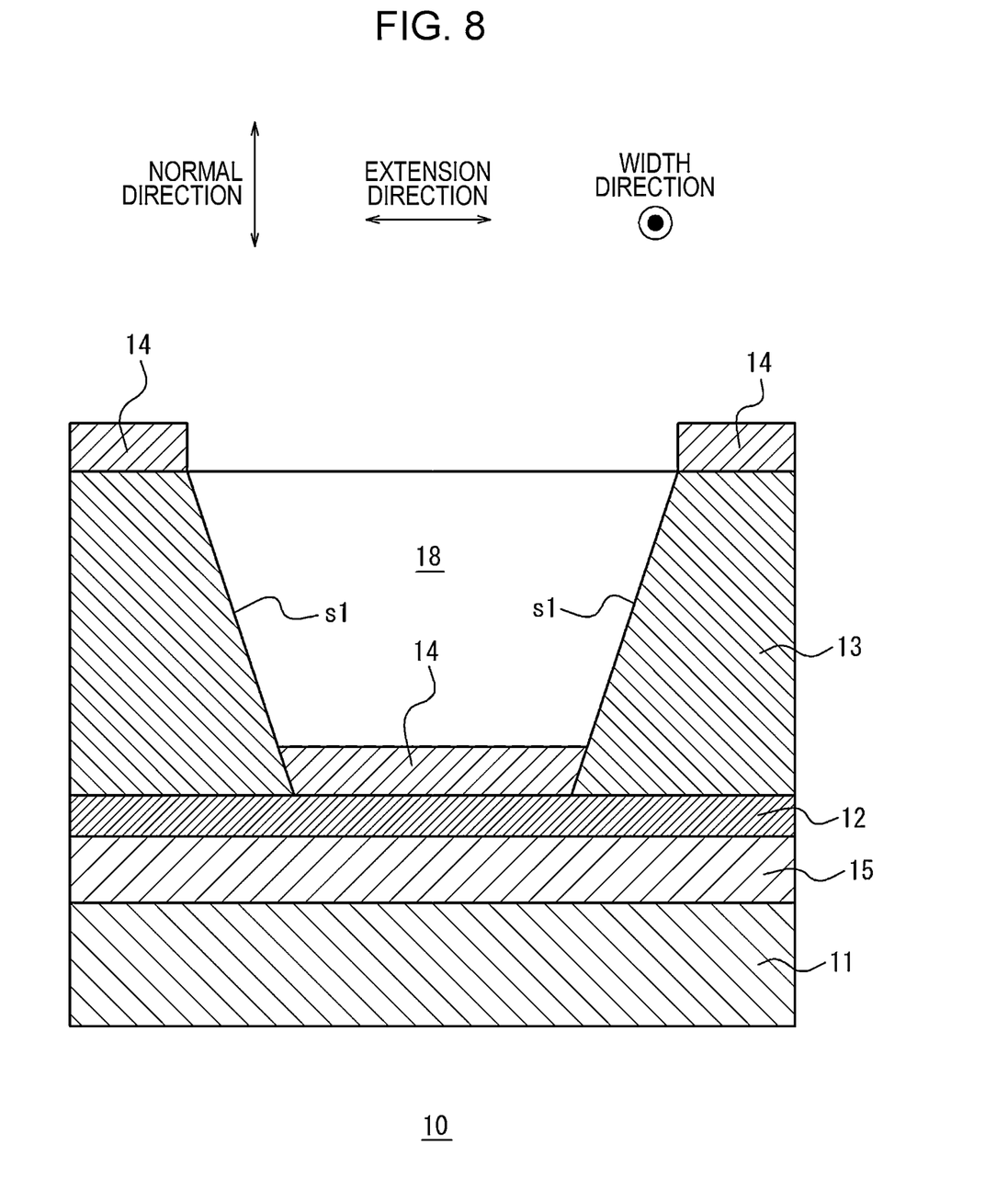
FIG. 8 is a sectional view taken along a cross-section perpendicular to a width direction of an isolator including a recess in another variation of FIG. 6.

As illustrated in FIG. 6, the recess 18 is defined by surfaces including first surfaces s1 that are positioned at end portions in the extension direction of the first waveguide portion 16 and that may be perpendicular to the extension direction. As illustrated in FIG. 7, the first surfaces s1 may alternatively be inclined about a straight line parallel to the normal direction from a plane perpendicular to the extension direction. As illustrated in FIG. 8, the first surfaces s1 may still alternatively be inclined outward from the recess 18 with respect to the normal direction.

The recess 18 may have a length in the width direction equal to or more than a length of the non-reciprocal member 14, described later, positioned inside the recess 18. The length in the width direction of the recess 18 may be the minimum length when the length is varied in the normal direction as illustrated in FIG. 8. The length in the width direction of the recess 18 may be longer than a size of a crystal obtained by crystallization of the non-reciprocal member 14 positioned inside the recess 18. In other words, the length in the width direction of the recess 18 may be longer than the crystal size of the non-reciprocal member 14 positioned inside the recess 18.

The non-reciprocal member 14 shifts a phase of an electromagnetic wave in a TM mode propagating in the first waveguide portion 16. A magnetic field for development of non-reciprocity by the non-reciprocal member 14 may be applied to the isolator 10.

As illustrated in FIGS. 1, 4, 5, and 8, the non-reciprocal member 14 may be positioned to overlap with at least part of the first waveguide portion 16 at least inside the recess 18 when viewed in the normal direction. The non-reciprocal member 14 may further be positioned to cover a region other than the recess 18 of the insulating layer 13 when viewed in the normal direction.

The non-reciprocal member 14 may be positioned in contact with at least part of the bottom surface of the recess 18. For example, the non-reciprocal member 14 may be positioned in contact with part of the bottom surface of the recess 18. As illustrated in FIGS. 1, 4, and 5, the non-reciprocal member 14 may alternatively be positioned in contact with the entire bottom surface of the recess 18.

As illustrated in FIGS. 1 and 4, the non-reciprocal member 14 may be in contact with at least part of the first waveguide portion 16. For example, as illustrated in FIGS. 1 and 4, the non-reciprocal member 14 may be in contact with the entire upper surface of the first waveguide portion 16. Furthermore, as illustrated in FIG. 4, the non-reciprocal member 14 may be in contact with parts, adjacent to the upper surface, of both end surfaces in the width direction, in other words, side surfaces, of the first waveguide portion 16.

As illustrated in FIG. 5, the non-reciprocal member 14 is not necessarily in contact with the first waveguide portion 16. Specifically, the insulating layer 13 may be interposed between the non-reciprocal member 14 and the first waveguide portion 16. The insulating layer 13 interposed between the first waveguide portion 16 and the non-reciprocal member 14 may have a thickness in the normal direction equal to or less than a first value. The first value may be determined in accordance with a mode field diameter of the first waveguide portion 16 and the thickness in the normal direction of the first waveguide portion 16. More specifically, the first value may be obtained by subtracting a half of the thickness in the normal direction of the first waveguide portion 16 from the mode field diameter of the first waveguide portion 16.

In the present embodiment, the waveguide portion 12 has a rectangular sectional shape. The mode field diameter is defined in such a configuration. The electromagnetic wave in the TM mode propagating in the waveguide portion 12 includes an electric field component having energy that decreases outside the waveguide portion 12 in a direction away from the waveguide portion 12. The energy of the electric field component of the electromagnetic wave in the TM mode outside the waveguide portion 12 has a magnitude according to a Gaussian distribution. The mode field diameter is defined as a distance to a position where the magnitude of the energy decreases to $1/e^2$ of the magnitude of the energy of the electric field component at a center of a cross-section perpendicular to the extension direction of the waveguide portion 12.

In the present disclosure, the mode field diameter may be measured in the following manner. When light enters one of the end surfaces of the first waveguide portion 16 and outgoing light from the other end surface is captured with a camera, a light intensity distribution on the end surface is detected. In this light intensity distribution, the mode field diameter is measured as an interval between a peak position and a position at an intensity of $1/e^2$ of the peak intensity.

The mode field diameter at the waveguide portion 12 is determined in accordance with a length in the width direction of the waveguide portion 12 in the cross-section perpendicular to the extension direction of the waveguide portion 12, a length in the normal direction of the waveguide portion 12, a refractive index of the waveguide portion 12, a refractive index of the insulating layer 13, and a wavelength of the electromagnetic wave propagating in the waveguide portion 12. The wavelength of the electromagnetic wave propagating in the waveguide portion 12 may be determined by the emitter attached to the isolator 10.

For example, the mode field diameter is 800 nm when the length in the width direction of the waveguide portion 12 is 400 nm, the length in the normal direction of the waveguide portion 12 is 220 nm, the refractive index of the waveguide portion 12 is 3.45, the refractive index of the insulating layer 13 is 1.53, and the wavelength of the electromagnetic wave in the TM mode propagating in the waveguide portion 12 is 1550 nm.

Alternatively, for example, the mode field diameter is 520 nm when the length in the width direction of the waveguide portion 12 is 500 nm, the length in the normal direction of the waveguide portion 12 is 220 nm, the refractive index of the waveguide portion 12 is 3.45, the refractive index of the insulating layer 13 is 1.53, and the wavelength of the electromagnetic wave in the TM mode propagating in the waveguide portion 12 is 1550 nm.

Figure 9:
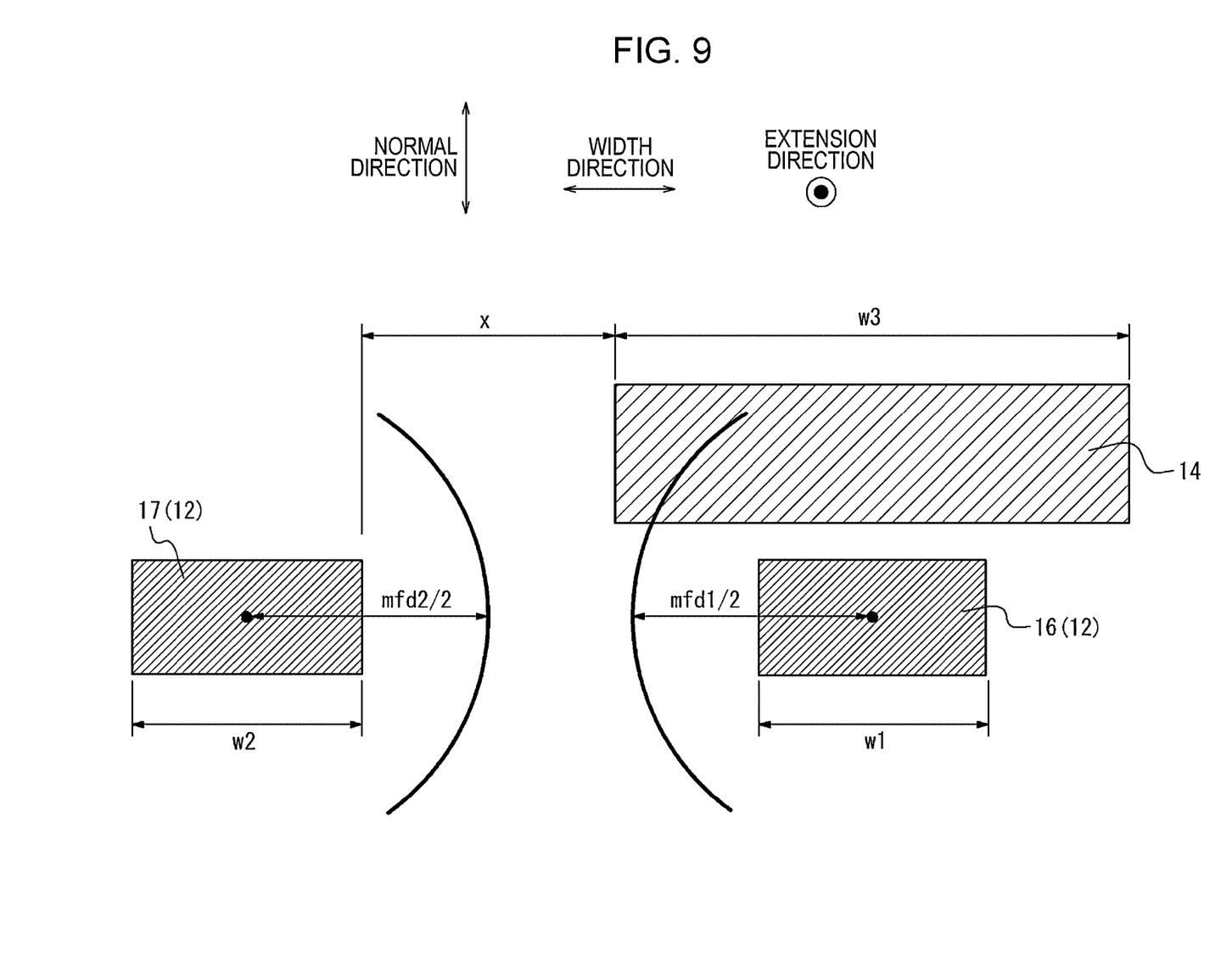
FIG. 9 is an explanatory conceptual view for sizes in a width direction of some constituent elements in the isolator illustrated in FIG. 1.

As illustrated in FIG. 9, in a cross-section perpendicular to the extension direction of the first waveguide portion 16, a length w3 in the width direction of the non-reciprocal member 14 satisfies expression (1) below.

$$w1 \leq w3 \leq mfd1 + mfd2 - w2 - 2 \times x \qquad (1)$$

In Expression (1), w1 is a length in the width direction of the first waveguide portion 16. w2 is a length in the width direction of the second waveguide portion 17 adjacent to the first waveguide portion 16. When the second waveguide portion 17 is disposed adjacent to each side in the width direction of the first waveguide portion 16, w2 may be the length in the width direction of the second waveguide portion 17 positioned closer to the first waveguide portion 16. x is an interval in the width direction between an end in the width direction of the non-reciprocal member 14 and the second waveguide portion 17 adjacent to the first waveguide portion 16. When the second waveguide portion 17 is disposed adjacent to each side in the width direction of the first waveguide portion 16, x may be the interval from the second waveguide portion 17 positioned closer to the first waveguide portion 16. mfd1 is the mode field diameter of the first waveguide portion 16. mfd2 is the mode field diameter of the second waveguide portion 17 adjacent to the first waveguide portion 16. When the second waveguide portion 17 is disposed adjacent to each side in the width direction of the first waveguide portion 16, mfd2 may be the mode field diameter of the second waveguide portion 17 positioned closer to the first waveguide portion 16.

The interval x in the width direction between the end in the width direction of the non-reciprocal member 14 and the second waveguide portion 17 adjacent to the first waveguide portion 16 further satisfies expression (2) below.

$$x \geq (mfd2 - w2)/2 \qquad (2)$$

The non-reciprocal member 14 may be made of YIG (yttrium iron garnet). The non-reciprocal member 14 may thus contain YIG. YIG as a material for the non-reciprocal member 14 may be partially substituted YIG, such as Ce:YIG or Bi:YIG (bismuth-substituted YIG). Examples of the material for the non-reciprocal member 14 may include a ferromagnetic material such as FeCo, FeNi, or CoPt, and a substance containing the ferromagnetic material. Examples of the material for the non-reciprocal member 14 may further include a dielectric composited with magnetic nanoparticles, such as a nanogranular material. The material for the non-reciprocal member 14 is not limited to the above, and examples thereof may further include other various magnetic materials.

In the present embodiment, the isolator 10 thus configured includes the substrate 11, the plurality of waveguide portions 12, the insulating layer 13, and the non-reciprocal member 14. The plurality of waveguide portions extends along the main surface of the substrate 11 and is positioned side by side on the main surface. The insulating layer covers at least part of the outer edges of the plurality of waveguide portions 12 in the cross-section perpendicular to the extension direction of the plurality of waveguide portions 12, and includes the recess 18 in the surface on the opposite side from the substrate 11 at the position overlapping with the first waveguide portion 16 that is part of the plurality of waveguide portions 12 when viewed in the normal direction of the main surface. The non-reciprocal member is positioned to overlap with at least part of the first waveguide portion 16 inside the recess 18 when viewed in the normal direction of the main surface. In the cross-section perpendicular to the extension direction of the first waveguide portion 16, when the length of the first waveguide portion 16 in the width direction perpendicular to the normal direction is w1, the interval in the width direction between the end of the non-reciprocal member 14 and the waveguide portion 17 adjacent to the first waveguide portion 16 is x, the mode field diameter of the first waveguide portion 16 is mfd1, the mode field diameter of the waveguide portion 17 is mfd2, the length in the width direction of the waveguide portion 17 is w2, and the length in the width direction of the non-reciprocal member 14 is w3, expressions (1) and (2) are satisfied. To reduce a size of an isolator, waveguides may be disposed partially adjacent to each other. However, waveguides having a small interval may function as a directional coupler and an electromagnetic wave may propagate from a waveguide to another waveguide. Furthermore, if a waveguide undesired to develop non-reciprocity is positioned close to a waveguide desired to develop non-reciprocity, the waveguide undesired to develop non-reciprocity may also develop non-reciprocity. Regarding such a phenomenon, the isolator 10 configured as described above satisfies expression (2) and can thus suppress development of non-reciprocity for the second waveguide portion 17. Furthermore, the isolator 10 satisfies expression (1) and can thus prevent the first waveguide portion 16 and the second waveguide portion 17 from functioning as a directional coupler while exhibiting an enhanced non-reciprocity development effect. The isolator 10 can thus develop desired non-reciprocity and suppress influence on the other waveguide portions 12 while having a smaller interval between the first waveguide portion 16 and the second waveguide portion 17. The isolator 10 can therefore be reduced in size while exhibiting a desired non-reciprocity effect.

In the isolator 10, at least part of the first waveguide portion 16 is in contact with the non-reciprocal member 14. The isolator 10 thus configured minimizes the interval between the first waveguide portion 16 and the non-reciprocal member 14 and can therefore enhance non-reciprocity developed by the first waveguide portion 16.

In the isolator 10, the insulating layer 13 is interposed between the first waveguide portion 16 and the non-reciprocal member 14. In the isolator 10 thus configured, the insulating layer 13 protects the first waveguide portion 16 in a subprocess of forming a non-reciprocal member in a manufacture process, and can therefore reduce a loss of the electromagnetic wave in the first waveguide portion 16 in a completed product.

In the isolator 10, the thickness in the normal direction of the insulating layer 13 interposed between the first waveguide portion 16 and the non-reciprocal member 14 is equal to or less than a value determined in accordance with the mode field diameter of the first waveguide portion 16 and the thickness in the normal direction of the first waveguide portion 16. The isolator 10 thus configured can cause the first waveguide portion 16 to develop non-reciprocity even when the insulating layer 13 is interposed between the first waveguide portion 16 and the non-reciprocal member 14.

In the isolator 10, the length in the width direction of the recess 18 is larger than the crystal size of the non-reciprocal member 14. The isolator 10 thus configured can promote crystallization of the non-reciprocal member 14 and can therefore cause non-reciprocal member 14 to develop sufficient non-reciprocity.

Among the surfaces defining the recess 18 of the isolator 10, the surfaces s1 positioned at the end portions in the extension direction are inclined from a plane perpendicular to the extension direction. The isolator 10 thus configured gently changes an effective refractive index of the first waveguide portion 16 from a range overlapping with the recess 18 toward outside a range of the recess 18. The isolator 10 gently changes the effective refractive index of the first waveguide portion 16 to suppress reflection of the electromagnetic wave at a boundary between the range overlapping with the recess 18 and outside the range of the recess 18 in the first waveguide portion 16. As a result, the isolator 10 reduces a loss of the electromagnetic wave.

Among the surfaces defining the recess 18 of the isolator 10, the surfaces s1 positioned at the end portions in the extension direction are inclined outward from the recess 18 with respect to the normal direction. The isolator 10 thus configured gradually increases the distance from the upper surface of the first waveguide portion 16 to the non-reciprocal member 14, and therefore gently changes the effective refractive index of the first waveguide portion 16 from the range overlapping with the recess 18 toward outside the range of the recess 18. As a result, the isolator 10 reduces a loss of the electromagnetic wave.

The embodiment of the present disclosure has been described with reference to the figures and implementation examples. Note that those skilled in the art can easily apply various changes or modifications in accordance with the present disclosure. Accordingly, note that these changes or modifications are included in the scope of the present disclosure. For example, functions and the like included in individual constituent units or individual steps can be reallocated without logical inconsistency. A plurality of constituent units or steps can be combined into a single constituent unit or step, or each constituent unit or step can be divided into a plurality of units or steps.

In the present disclosure, expressions such as "first" and "second" are identifiers for distinction between relevant configurations. In the present disclosure, the configurations distinguished by the expressions such as "first" and "second" can have their numbers exchanged. For example, the first waveguide portion and the second waveguide portion can have their identifiers "first" and "second" exchanged. The identifiers are exchanged simultaneously. These configurations are still distinguished after the exchange of the identifiers. The identifiers may be deleted. The configurations having their identifiers deleted are distinguished by reference signs. In the present disclosure, the recitation of the identifiers such as "first" and "second" should not solely be used as grounds for interpretation of the order of these configurations or the presence of any identifier having a smaller number.

REFERENCE SIGNS

- 10 isolator
- 11 substrate
- 12 waveguide portion
- 13 insulating layer
- 14 non-reciprocal member
- 15 box layer
- 16 first waveguide portion
- 17 second waveguide portion
- 18 recess
- s1 first surface

The invention claimed is:

1. An isolator comprising:
   a substrate;
   a plurality of waveguide portions extending along a main surface of the substrate and positioned side by side on the main surface;
   an insulating layer covering at least part of outer edges of the plurality of waveguide portions in a cross-section perpendicular to an extension direction of the plurality of waveguides, and including a recess in a surface on an opposite side from the substrate at a position overlapping with a first waveguide portion that is part of the plurality of waveguide portions when viewed in a normal direction of the main surface; and
   a non-reciprocal member positioned to overlap with at least part of the first waveguide portion inside the recess when viewed in the normal direction of the main surface, wherein
   in a cross-section perpendicular to an extension direction of the first waveguide portion, when a length of the first waveguide portion in a width direction perpendicular to the normal direction is w1, an interval in the width direction between an end of the non-reciprocal member and the waveguide portion adjacent to the first waveguide portion is x, a mode field diameter of the first waveguide portion is mfd1, a mode field diameter of the waveguide portion is mfd2, a length in the width direction of the waveguide portion is w2, and a length in the width direction of the non-reciprocal member is w3, expressions (1) and (2) are satisfied:

$$w1 \leq w3 \leq mfd1 + mfd2 - w2 - 2 \times x \quad (1)$$

$$x \geq (mfd2 - w2)/2. \quad (2)$$

2. The isolator according to claim 1, wherein
at least part of the first waveguide portion is in contact with the non-reciprocal member.

3. The isolator according to claim 1, wherein
the recess includes a bottom surface positioned closer to the substrate in the normal direction than is a position of a surface of the first waveguide portion on an opposite side from the substrate.

4. The isolator according to claim 1, wherein
the insulating layer is interposed between the first waveguide portion and the non-reciprocal member.

5. The isolator according to claim 4, wherein
a thickness in the normal direction of the insulating layer interposed between the first waveguide portion and the non-reciprocal member is equal to or less than a value determined in accordance with the mode field diameter of the first waveguide portion and a thickness in the normal direction of the first waveguide portion.

6. The isolator according to claim 1, wherein
the recess has a length in the width direction larger than a crystal size of the non-reciprocal member.

7. The isolator according to claim 1, wherein
the non-reciprocal member contains YIG (yttrium iron garnet).

8. The isolator according to claim 1, wherein
the recess is defined by surfaces including a surface that is positioned at an end portion in the extension direction and that is inclined from a plane perpendicular to the extension direction.

9. The isolator according to claim 1, wherein
the recess is defined by surfaces including a surface that is positioned at an end portion in the extension direction and that is inclined outward from the recess with respect to the normal direction.

* * * * *